United States Patent [19]

Engel et al.

[11] 4,089,794

[45] May 16, 1978

[54] POLYMERIC ADDITIVES FOR FUELS AND LUBRICANTS

[75] Inventors: Lawrence J. Engel, Green Brook; John B. Gardiner, Mountainside, both of N.J.

[73] Assignee: Exxon Research & Engineering Co., Linden, N.J.

[21] Appl. No.: 724,464

[22] Filed: Sep. 17, 1976

Related U.S. Application Data

[63] Continuation-in-part of Ser. No. 590,040, Jun. 25, 1975, abandoned.

[51] Int. Cl.² .................. C10M 1/28; C10M 1/36; C08L 23/26
[52] U.S. Cl. .................. 252/51.5 A; 252/56 D; 260/878 R
[58] Field of Search .................. 252/56 D, 51.5 A; 260/878

[56] References Cited

U.S. PATENT DOCUMENTS

| | | | |
|---|---|---|---|
| 3,197,409 | 7/1965 | deVries | 252/56 D |
| 3,272,746 | 9/1966 | Le Suer | 252/34 |
| 3,316,177 | 4/1967 | Dorer, Jr. | 252/51.5 A |
| 3,324,033 | 6/1967 | Knapp | 252/51.5 A |
| 3,331,776 | 7/1967 | Krukziener | 260/485 G |
| 3,525,693 | 8/1970 | Lyle et al. | 252/56 D |
| 3,687,905 | 8/1972 | Dorer | 252/51.5 A |
| 3,864,270 | 2/1975 | Cullen et al. | 252/51.5 A |
| 3,953,541 | 4/1976 | Fuji | 260/878 R |
| 3,991,098 | 11/1976 | Okamoto | 252/51.5 A |
| 4,033,889 | 7/1977 | Kiovsky | 252/56 D |

FOREIGN PATENT DOCUMENTS

| | | | |
|---|---|---|---|
| 1,444,904 | 2/1969 | Germany | 252/51.5 A |

*Primary Examiner*—Delbert E. Gantz
*Assistant Examiner*—J. Thierstein
*Attorney, Agent, or Firm*—Henry Freeman; Roland A. Dexter; Frank T. Johmann

[57] ABSTRACT

Ethylene copolymers derived from about 2 to 98 wt. % ethylene, and one or more $C_3$ to $C_{28}$ alpha olefins, e.g. ethylene-propylene, are solution-grafted under an inert atmosphere and at elevated temperatures with an ethylenically-unsaturated carboxylic acid material in the presence of a high-temperature decomposable free-radical initiator and thereafter reacted with a polyfunctional material reactive with carboxy groups; such as (a) a polyamine, or (b) a polyol, or (c) a hydroxyamine, or mixtures thereof, to form carboxyl-grafted polymeric derivatives, which have good engine sludge and varnish control behavior in fuels and lubricating oils. If the molecular weight is above 10,000, then these polymers are also useful as multifunctional viscosity index improvers.

17 Claims, No Drawings

POLYMERIC ADDITIVES FOR FUELS AND LUBRICANTS

CROSS REFERENCE TO RELATED APPLICATION

This application is a continuation-in-part of application Ser. No. 590,040 filed June 25, 1975 and now abandoned.

This invention relates to polymeric dispersant additives for lubricating oils and hydrocarbon fuels which may also be useful as viscosity-index improvers for lubricating oils. More particularly, this invention relates to substantially saturated polymers comprising ethylene and one or more $C_3$ to $C_{28}$ alpha-olefins, preferably propylene, which have been solution-grafted in the presence of a free-radical initiator with an ethylenically-unsaturated carboxylic acid material at an elevated temperature, preferably in an inert atmosphere, and thereafter reacted with a polyfunctional material reactive with carboxy groups, such as (a) a polyamine, (b) a polyol or (c) a hydroxy amine, or mixtures thereof, to form multifunctional polymeric reaction products.

A variety of polymeric materials which incorporate nitrogen and/or oxygen have been described in U.S. and foreign patents as dispersants for fuels and lubricants and as viscosity index improvers for lubricants. For example:

U.S. Pat. No. 3,326,804 improves the sludge dispersant properties of oleaginous compositions by adding thereto the reaction product of a polyalkylene polyamine with the product obtained by grafting maleic anhydride onto hydroperoxidized ethylene copolymer.

U.S. Pat. No. 3,404,091 grafted polar monomers, such as acrylonitrile or methylacrylamide, onto hydroperoxidized copolymers of ethylene and propylene to produce multifunctional additives.

U.S. Pat. No. 3,404,092 reacts hydroxylated ethylene-propylene copolymers with isocyanates to produce viscosity index improvers exhibiting improved thickening potencies and shear stabilities in petroleum oils.

U.S. Pat. No. 3,687,849 grafts various unsaturated monomers including unsaturated polybasic acids, including maleic anhydride, onto a degraded, hydroperoxidized, interpolymers of ethylene and propylene (see also U.S. Pat. Nos. 3,388,067, 3,687,905 and 3,785,980).

U.S. Pat. No. 3,769,216 shows an atactic (i.e., non-crystalline) copolymer of ethylene and propylene containing from 45 to 65 mole percent of ethylene, mechanically degraded in the presence of oxygen followed by reaction with a polyamine.

British Pat. No. 1,031,130 discloses an additive prepared by reacting a polyolefin carrying a succinic acid group with a hydroxy aliphatic amine, said succinic acid group having been incorporated onto a polyolefin having several double bonds or several halogen atoms to provide for the formation of said double bonds. British Pat. No. 1,172,818 describes the preparation of lube oil additives by the condensation of an amine with an oxidized, e.g., ozonized, polymer.

It is also known to graft ethylenically unsaturated carboxylic acid material, e.g. maleic anhydride, onto saturated ethylene copolymers and terpolymers in the presence of a free-radical initiator, such as an organic peroxide. The grafting can be done in the presence of a solvent, such as benzene and low-molecular weight paraffins (see Belgian Pat. No. 607,269) and halobenzenes (see U.S. Pat. No. 3,255,130). This grafting has also been done at temperatures of from 150° C. to 200° C. without a solvent (see U.S. Pat. No. 3,427,183). Such maleic anhydride, free-radical initiated grafted ethylene polymeric materials have also been subsequently reacted with polyfunctional compounds capable of promoting cross linkages between the various polymeric chains, e.g., metallic oxides and hydroxides, glycols and diamines (see U.K. Pat. No. 885,969 and U.S. Pat. No. 3,236,917).

In contrast to the above-noted prior art, it has been discovered that it is possible to produce an oil-soluble, sludge-dispersing additive for hydrocarbon fuels and lubricating oils, which additive may also improve the viscosity index of said lubricating oils, by the free-radical induced grafting in solution of an ethylenically-unsaturated dicarboxylic acid material onto a substantially saturated copolymer comprising ethylene and at least one other alpha-olefin at an elevated temperature to provide, without substantial polymer degradation, a useful precursor polymer which can be subsequently reacted with a carboxylic acid-reacting polyfunctional material, such as a polyamine, a polyol or a hydroxyamine, or mixtures of these, to form multifunctional polymeric derivatives having particular utility as engine sludge and varnish control additives for lubricating oils.

I. The Ethylene Copolymer

The ethylene copolymers to be grafted in accordance with this invention contain from about 2 to about 98, preferably 30 to 80 wt. % of ethylene, and about 2 to 98, preferably 20 to 70, wt. % of one or more $C_3$ to $C_{28}$, preferably $C_3$ to $C_{18}$, more preferably $C_3$ to $C_8$, alpha-olefins. Such copolymers preferably have a degree of crystallinity of less than 25 wt. %, as determined by X-ray and differential scanning calorimetry, and a number average molecular weight ($\overline{M}_n$) in the range of about 700 to about 500,000, preferably 700 to 250,000, as determined by vapor phase osmometry (VPO) or membrane osmometry. Copolymers of ethylene and propylene are most preferred. Other alpha-olefins suitable in place of propylene to form the copolymer or to be used in combination with ethylene and propylene to form a terpolymer include 1-butene, 1-pentene, 1-hexene, 1-octene; also branched chain alpha-olefins, such as 5-methylpentene-1 and 6-methylheptene-1 and mixtures thereof.

Terpolymers of ethylene, said alpha-olefin and a non-conjugated diolefin or mixtures of such diolefins may also be used. The amount of the non-conjugated diolefin ranges from about 0.5 to 20 mole percent, preferably about 1 to about 7 mole percent, based on the total amount of ethylene and alpha-olefin present. Representative diolefins include cyclopentadiene, 2-methylene-5-norbornene, non-conjugated hexadiene, or any other alicyclic or aliphatic nonconjugated diolefin having from 6 to 15 carbon atoms per molecule, such as 2-methyl or ethyl norbornadiene, 2,4-dimethyl-2-octadiene, 3-(2-methyl-1-propene) cyclopentene, ethylidene norbornene, etc.

These ethylene copolymers, this term including terpolymers, may be prepared using the well-known Ziegler-Natta catalyst compositions as described in U.K. Pat. No. 1,397,994.

Such polymerization may be effected to produce the ethylene copolymers by passing 0.1 to 15, for example, 5 parts of ethylene; 0.05 to 10, for example, 2.5 parts of said higher alpha-olefin, typically propylene; and from 10 to 10,000 parts of hydrogen per million parts of ethylene; into 100 parts of an inert liquid solvent containing (a) from about 0.0017 to 0.017, for example, 0.0086 parts of a transition metal principal catalyst, for example, VOCl$_3$; and (b) from about 0.0084 to 0.084, for example, 0.042 parts of cocatalyst, e.g. (C$_2$H$_5$)$_3$Al$_2$Cl$_3$; at a temperature of about 25° C. and a pressure of 60 psig for a period of time sufficient to effect optimum conversion, for example, 15 minutes to one-half hour; all parts being parts by weight.

II. Ethylenically Unsaturated Carboxylic Acid Materials

These materials which are grafted (attached) onto the copolymer are organic compounds which contain at least one ethylenic bond and at least two carboxylic acid or its anhydride groups or a polar group which is convertible into said carboxyl groups by oxidation or hydrolysis. Maleic anhydride or a derivative thereof is preferred as it does not appear to homopolymerize appreciably but grafts onto the ethylene copolymer or terpolymer to give two carboxylic acid functionalities. Such preferred materials have the generic formula

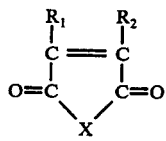

wherein R$_1$ and R$_2$ are hydrogen or a halogen and X is oxygen, NH or NR$_3$ wherein R$_3$ is a hydrocarbyl amine or alkyl group, e.g. a C$_1$ to C$_{40}$ alkyl, preferably C$_1$ to C$_{18}$ alkyl. Suitable examples include chloromaleic anhydride, itaconic anhydride, N-hexyl maleimide or the corresponding dicarboxylic acids, such as maleic acid or fumaric acid.

III. Grafting of the Polymer

The free-radical induced grafting of ethylenically unsaturated carboxylic acid materials in solvents, such as benzene is known in the art (U.S. Pat. No. 3,236,917). The grafting according to the process of this invention is carried out at an elevated temperature in the range of about 100° C. to 250° C., preferably 120° to 190° C., and more preferably 150° to 180° C., e.g. above 160° C., in a solvent, preferably a mineral lubricating oil solution containing, e.g. 1 to 50, preferably 5 to 30 wt. %, based on the initial total oil solution, of the ethylene polymer and preferably under an inert environment. The grafting is carried out in the presence of a high-temperature decomposable compound capable of supplying free radicals at said elevated temperature.

The free-radical initiators which may be used are peroxides, hydroperoxides, and azo compounds which have a boiling point greater than about 100° C. and decompose thermally within the grafting temperature range to provide said free radicals. Representative of these free-radical initiators are azobutyronitrile and 2,5-dimethyl-hex-3-yne-2,5-bis-tertiary-butyl peroxide, sold as Lupersol 130 by Wallace and Tiernan, Inc., or its hexene analogue. The initiator is used at a level of between about 0.005% and about 1%, based on the total weight of the polymer solution.

The ethylenically unsaturated dicarboxylic acid material, e.g. maleic anhydride, is used in an amount ranging from about 0.01% to about 10%, preferably 0.1 to 0.8%, based on the weight of the initial total oil solution. The aforesaid dicarboxylic acid material and free radical initiator are used in a weight percent ratio range of 1.0:1 to 30:1; preferably 2.0:1 to 5:1, more preferably 2.0:1 to 2.6:1. These ratios are the optimum ranges when using Lupersol 130. If other initiators are used, then the ratio should preferably be altered to give the same approximate number of moles of free radicals as with Lupersol 130 (which forms 4 moles free radicals per mole initiator).

The grafting is preferably carried out in an inert atmosphere, such as by nitrogen blanketing. While the grafting can be carried out in the presence of air, the yield of the desired graft polymer is decreased as compared to grafting under an inert atmosphere. The inert environment, which is preferred, should be free of oxygen, that is, preferably no substantial polymer oxidation should occur during the free-radical induced grafting of the polymer. No substantial oxidation is defined for the purposes of this invention as the introduction of less than about 0.05 wt. %, preferably less than about 0.01 wt. %, of oxygen into the grafted polymer excluding that introduced by the graft of said carboxylic acid material. The grafting time ranges from about 0.1 to 12 hours, preferably from about 0.5 to 6 hours, more preferably 0.5 to 3 hours. The graft reaction is carried out to at least approximately 4 times, preferably at least about 6 times the half-life of the free-radical initiator at the reaction temperature employed. Thus, for example, with Lupersol 130 about 2 hours is required at 160° C. and one hour at 170° C. Lupersol 130 has a boiling point of about 243° C. (extrapolated from the vapor pressure); its half-life at 160° C. is 20 minutes, at 170° C. it is 8 minutes and at 180° C. it is 3 minutes. The time and temperature combination should be such that substantially all the peroxide (i.e. above 90%) is decomposed.

In the grafting process, the copolymer solution is first heated to grafting temperature and thereafter said dicarboxylic acid material and initiator are added with agitation although they could have been added prior to heating. When the reaction is complete, the excess maleic anhydride is eliminated by an inert gas purge, e.g. nitrogen sparging.

In the grafting step, the maleic anhydride or other dicarboxylic acid material used is grafted onto both the polymer and oil reaction solvent, the wt. % grafted onto the polymer is normally greater than the amount grafted onto the oil due to greater reactivity of the polymer to grafting. However, the exact split between the two materials depends upon the polymer and its reactivity, the reactivity and type of oil, and also the concentration of the polymer in the oil. The split can be measured empirically from the infra red analyses of product dialyzed into oil and polymer fractions and measuring the anhydride peak absorbance in each.

The grafting is preferably carried out in a mineral lubricating oil which need not be removed after the grafting step but can be used as the solvent in the subsequent reaction of the graft polymer with the polyfunctional material and as a solvent for the end product to form the concentrate.

IV. Polyamines

Useful polyamines for reaction with the grafted ethylene-containing polymers include polyamines of about 2 to 60, e.g., 3 to 20, total carbon atoms and about 2 to 12, e.g. 2 to 6 nitrogen atoms in the molecule, which amines may be hydrocarbyl polyamines or may be hydrocarbyl polyamines including other groups, e.g., hydroxy groups, alkoxy groups, amide groups, imidazoline groups, and the like. Preferred amines are aliphatic saturated polyamines, including those of the general formula:

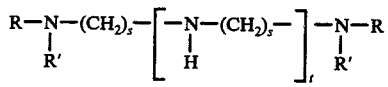

wherein R and R' are independently selected from the group consisting of hydrogen, $C_1$ to $C_{25}$ straight or branched chain alkyl radicals, $C_1$ to $C_{12}$ alkoxy $C_2$ to $C_6$ alkylene radicals, $C_2$ to $C_{12}$ hydroxy or amino alkylene radicals, and $C_1$ to $C_{12}$ alkylamino $C_2$ to $C_6$ alkylene radicals, s is a number of from 2 to 6, preferably 2 to 4, and t is a number of from 0 to 10, preferably 2 to 6.

Examples of suitable amine compounds include ditallow amine, 1,2-diaminoethane, 1,3-diaminopropane, 1,4-diaminobutane, 1,6-diaminohexane, diethylene triamine, triethylene tetraamine, tetraethylene pentamine, 1,2-propylene diamine, di-(1,2-propylene) triamine, di-(1,3-propylene) triamine, N,N-dimethyl-1,3-diaminopropane, N,N-di-(2-aminoethyl)ethylene diamine, N,N-di-(2-hydroxyethyl)-1,3-propylene diamine, and N-dodecyl-1,3-propane diamine.

Other useful amine compounds include alicyclic diamines such as 1,4-di-(aminoethyl) cyclohexane, and heterocyclic nitrogen compounds such as imidazolines and N-aminoalkyl piperazines of the general formula:

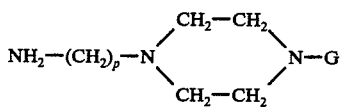

wherein G is hydrogen or an omega-aminoalkylene radical of from 1 to 3 carbon atoms and p is an integer of from 1 to 4. Examples of such amines include 2-pentadecyl imidazoline, N-(2-aminoethyl) piperazine, N-(3-aminopropyl) piperazine, and N,N'-di-(2-aminoethyl) piperazine. Amino morpholines, such as N-(3-aminopropyl) morpholine can also be used.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene groups, forming such compounds as diethylene triamine, triethylenetetramine, tetraethylene pentamine and isomeric piperazines. Low cost poly(ethylene amines) compounds having a composition approximating tetraethylene pentamine are available commercially under the trade name Polyamine 400. Still other polyamines separated by hetero atom chains such as polyethers or sulfides can be used.

V. Polyols

Useful polyols for reaction with the grafted ethylene-containing polymers are polyhydric, preferably hydrocarbyl, alcohols containing from about 2 to about 30, preferably 2 to 6, carbon atoms and from about 2 to about 10, preferably 2 to 5, hydroxyl radicals; for example, glycerol, alkylene glycols such as dipropylene glycol, trimethylol ethane, trimethylol propane, and pentaerythritol which is preferred.

VI. Hydroxy Amines

Useful hydroxy amines for reaction with the grafted ethylene-containing polymer are primary and secondary amines having 2 to 30 carbon atoms, preferably 2 to 6 carbon atoms, 1 to 6 hydroxy groups, preferably 2 to 3 hydroxy groups, and 1 to 10 nitrogen atoms, such as tris-hydroxymethyl aminomethane, diethanolamine and diisopropanolamine, etc. The products obtained from a 2,2-disubstituted-2-amino-1-alkanol having 2 to 3 hydroxy groups and containing a total of 4 to 8 carbon atoms as represented by 2-amino-2-(hydroxymethyl)-1,3-propanediol (also known as tris-hydroxy methylaminomethane) are preferred. Other examples of said hydroxy amines include 2-amino-2-methyl-1,3-propanediol; 2-amino-2-ethyl-1,3-propanediol, etc.

VII. Process

The grafted polymeric solution can be readily reacted with said polyamines, polyols, hydroxy amines and mixtures thereof by admixture together and heating at a temperature of from about 100° C. to 250° C. for from 10 minutes to 30 hours, preferably 10 minutes to 10 hours, usually about 15 minutes to about 3 hours. It is preferred to use 0.01 to 2.5 mole, more preferably 0.5 to 1.0 mole, of the polyfunctional material, e.g. polyamine, polyol or hydroxyamine, per mole of grafted maleic anhydride. The reaction of diethylene triamine with the grafted ethylene-containing polymer occurs in 15 minutes or less at 170° C. with a nitrogen blanket.

The grafting step according to this invention can be accomplished without degradation of the chain length (molecular weight) of the ethylene-containing polymer. Measurement of molecular weights and degradation can be evaluated by determination of the thickening efficiency of the polymer.

Thickening efficiency (T.E.) is defined as the ratio of the weight percent of a polyisobutylene (sold as an oil solution by Exxon Chemical Co. as Paratone N), having a Staudinger Molecular Weight of 20,000, required to thicken a solvent-extracted neutral mineral lubricating oil, having a viscosity of 150 SUS at 37.8° C., a viscosity index of 105 and an ASTM pour point of 0° F., (Solvent 150 Neutral) to a viscosity of 12.4 centistokes at 98.9° C., to the weight percent of a test copolymer required to thicken the same oil to the same viscosity at the same temperature. T.E. is related to $\overline{M}_n$ and is a much more convenient, practical measurement. As a rough guide, a T.E. of 1,4 is about a $\overline{M}_n$ of 17,000 while a T.E. of 2.86 is about a $\overline{M}_n$ of 60,000; polymer type influences this relationship.

The oil having attached, grafted maleic anhydride groups when reacted with the polyfunctional derivatives, e.g. polyamine, is also converted to the corresponding derivatives. If desired, the split between the derivatized graft polymer and the derivatized graft oil can be determined by dialysis into polymer and oil fractions and infrared or nitrogen analysis of the fractions.

The final reaction product contains in the range of 0.001 to 25, preferably 0.01 to 10, wt. % nitrogen and/or oxygen and has a $\overline{M}_n$ in the range of 700 to 500,000, preferably 700 to 250,000. For the polymeric additives of higher molecular weight, i.e. a $\overline{M}_n$ of from about 10,000 to about 500,000, e.g. 10,000 to 250,000, (useful for pour depressant and/or V.I.-improving applications), the nitrogen and/or oxygen content ranges from about 0.001 to 5 wt. percent, preferably 0.01 to 0.5 wt. %. For polymeric additives of lower molecular weights, i.e. $\overline{M}_n$ of less than about 10,000 (useful as pour depressant and/or dispersant), the nitrogen and/or oxygen content ranges broadly from about 0.001 to 25 wt. %, preferably from 0.01 to 8 wt. %. The unique advantages of the present invention include the features that there is no significant degradation of polymer chain length during the grafting of the polymer and subsequent imidation and that the amount of nitrogen-containing polymer material appears to be highly soluble in the hydrocarbon solvent used during the grafting step.

Minor amounts, e.g. 0.001 to 49 wt. %, preferably 0.001 to 20%, of the oil-soluble nitrogen and/or oxygen containing graft polymers of the invention can be incorporated into a major amount of an oleaginous material, such as a lubricating oil or hydrocarbon fuel. When used in lubricating oil compositions, e.g., automotive or diesel crankcase lubricating oil, the polymer concentrations are within the range of about 0.01 to 20 wt. %, e.g., 0.1 to 15.0 wt. %, preferably 0.25 to 10.0 wt. %, of the total composition. The lubricating oils to which the products of this invention can be added include not only hydrocarbon oil derived from petroleum, but also include synthetic lubricating oils such as esters of dibasic acids and complex esters made by esterification of monobasic acids, polyglycols, dibasic acids and alcohols.

These polymeric additives can be incorporated in fuels, such as middle distillate fuels, at concentrations of from about 0.001 to about 0.5 wt. % and higher, preferably from about 0.005 to 0.2 wt. %, of the total composition. These polymeric additives can contribute dispersant activity to the fuel as well as varnish control behavior.

The nitrogen and/or oxygen containing graft polymers of the invention may be prepared in a concentrate form, e.g., from about 5 wt. % to about 49 wt. %, preferably 15 to 49 wt. %, in oil, e.g., mineral lubricating oil, for ease of handling.

The above concentrates may contain other conventional additives, such as dyes, pour point depressants, antiwear agents, antioxidants, other viscosity-index improvers, dispersants and the like.

EXAMPLE 1

One gallon (3000 gms.) of a 9 wt. % solution of an ethylene-propylene copolymer made by the Ziegler-Natta process using $H_2$-moderated $VOCl_3$/aluminum sesquichloride catalyst, the copolymer having a crystallinity of less than 25% containing about 54 wt. % ethylene and 46 wt. % propylene, having a T.E. of 2.86 ($\overline{M}_n$ = 60,000), (which is equivalent to about 0.005 mole copolymer) in S100N (Solvent 100 Neutral) neutral oil was heated to 180° C. under a nitrogen blanket. To this was added with stirring 11.25 gms. (0.375 wt. %, 0.115 mole) of maleic anhydride and 2.7 gms. (0.09 wt. %) of 2,5-dimethyl-hex-3-yne-2,5-bis-tertiary-butyl peroxide. After about 5 hours the system maintained at 180° C. was sparged with nitrogen for 2 hours to remove all of the unreacted maleic anhydride. To this system cooled to 150° C. 10 gms. (0.33 wt. %, 0.096 mole) of diethylene triamine was added. The wt. % are all based on the weight of the initial oil solution. The reaction was conducted for 3 hours at 150° C. followed by sparging with nitrogen for 3 hours at 180° C. This resulted in a nitrogen-containing grafted copolymer having a T.E. of 2.99 thus showing that there was no breakdown in molecular weight but instead a slight increase. The product was subjected to infrared analysis which showed the 1790 micron absorption peak indicative of the acid anhydride group essentially eliminated and replaced by an amide peak at 1710 micron after reaction with the polyamine.

EXAMPLES 2–11

The following Table I describes a number of experiments carried out according to this invention. The reactions were carried out essentially as that of Example 1 except for variations in reactants and their concentrations and reaction conditions as noted in said table; the same peroxide was used as in Example 1 and the copolymer was made by the same process.

TABLE I

| Example | Oil Soln. Wt. % Polymer | Maleic Anhydride Wt. % | Peroxide Wt. % | Graft Reaction Under N2 Temp. °C | Graft Reaction Under N2 Time (hrs.) | Sparge Temp. % | Sparge Time (hrs.) | Polyol or Amine wt. % | Amine/Polyol Reaction Temp. °C | Amine/Polyol Reaction Time (hrs.) |
|---|---|---|---|---|---|---|---|---|---|---|
| 2 | 13.6 | 0.367 | 0.083 | 180 | 4 | 180 | 1 | (DETA)* 0.333 | 150 | 2 |
|   | Polymer is ethylene-propylene copolymer with 54 wt. % ethylene content and T.E. of 1.4 ($\overline{M}_n$ 14,000) | | | | | | | | | |
| 3 | 8 | 0.333 | 0.08 | 180 | 4 | 180 | 4 | (DETA*) 0.233 | 150 | 2 |
|   | Polymer is ethylene-propylene copolymer with 46 wt. % ethylene content and T.E. of 2.86 ($\overline{M}_n$ 60,000) | | | | | | | | | |
| 4 | 18 | 0.3 | 0.01 | 160 | 2.5 | 170 | 2 | (DETA*) 0.169 | 170 | 2 |
| 5 | 18 | 0.413 | 0.068 | 160 | 2 | 170 | 2 | (DETA*) 0.277 | 170 | 1 |
| 6 | 8.5 | 0.375 | 0.09 | 180 | 4 | 180 | 1 | (DETA*) 0.464 | 150 | 2 |
|   | Polymer is ethylene-propylene copolymer with 54.4 wt. % ethylene content and T.E. of 2.86 ($\overline{M}_n$ 60,000) | | | | | | | | | |
| 7 | 9.0 | 0.375 | 0.09 | 180 | 5 | 180 | 2 | (THAM)** 0.080 | 150 | 2.5 |
| 8 | 9.0 | 0.375 | 0.09 | 180 | 5 | 180 | 2 | (PAM-400)*** (0.300) | 150 | 2.5 |
| 9 | 10 | 0.166 | 0.05 | 180 | 5 | 180 | 2 | (DETA)* 0.201 | 150 | 3 |
| 10 | 10 | 0.166 | 0.05 | 180 | 5 | 180 | 2 | (N,N-DMPDA)**** 0.110 | 150 | 3 |
| 11 | 14.4 | 0.3 | 0.07 | 170 | 2.5 | 170 | 1.5 | (N,N-DMPDA)**** 0.385 *****(P.E.) | 170 followed 205 | 1.25 by 1.2 |

*DETA is diethylene triamine;
**THAM is tris-hydroxymethyl aminomethane;
***PAM-400 is the commercially available Polyamine 400; and
****N,N-DMPDA is N,N-dimethyl propane diamine
*****P.E. is pentaerythritol

EXAMPLE 12

Two fully formulated lubricating oil blends were prepared by blending 6.5 wt. % of the additive of Example 1 or 9.8 wt. % of the additive of Example 2 respectively with 4.0 wt. % of a borated ashless dispersant (40% active ingredient), 0.9 wt. % of a commercial zinc dialkyl dithiophosphate antiwear additive (70% active ingredient), 1.0% of an overbased magnesium hydrocarbon sulfonate concentrate (400 total base number), 0.3 wt. % of a rust inhibitor (ethoxylated alkyl phenol) and 0.5% of an ashless antioxidant, the balance of the formulation being a refined lubricating oil base stock. The fully formulated lubricant had a viscosity in the SAE 10W-30 range.

For comparison, two similar blends were prepared substituting for the additive of this invention 9.1 wt. % of an ethylene-propylene copolymer containing about 54 wt. % ethylene and having a T.E. of 1.4 with the same oil/additive package as above to make test Blend C and 6.0 wt. % of a commercially available methacrylate multifunctional viscosity index improver-dispersant (about 45% active ingredient) sold as Acryloid 956 by Rohm and Haas of Philadelphia, Pennsylvania, with the same oil/additive package as above to make Test Blend D.

Each of the blends prepared as described was subjected to the MS Sequence VC Engine Test which is a test well known in the automotive industry. The test is run in a Ford engine of 302 cubic inch displacement following the procedure described in the publication entitled "Multicylinder Test Sequences for Evaluating Automotive Engine Oils" (ASTM Special Publication 315-E). At the end of each test various parts of the engine are rated on a merit basis wherein 10 represents a perfectly clean part, and lesser numbers represent increasing degree of deposit formation. The various ratings are then totaled and averaged on the basis of 10 as a perfect rating. The results obtained with the blends described above are given in Table II.

TABLE II

MS SEQUENCE VC TEST RESULTS
MERIT RATINGS (BASIS 10)

| | Additive of | | Test Blend | |
|---|---|---|---|---|
| | Example 1 | Example 2 | C | D |
| Wt% (100% active basis) | 0.585 | 1.33 | 1.24 | 2.7 |
| Sludge Merit | 8.5 | 9.4 | 6.4 | 8.8 |
| Varnish Merit | 8.4 | 8.3 | 7.3 | 8.2 |
| Piston Skirt Varnish Merit | 8.0 | 8.4 | 7.0 | 8.2 |

The above tests show that on a weight basis, the additives which can be prepared by this invention, are better than a commercial multifunctional viscosity index improver (Blend D). A comparison of Examples 1 and 2 with Test Blend C indicates that the present invention significantly improves the dispersancy of ethylene-propylene copolymers generally used as viscosity index improvers.

What is claimed is:

1. A process for preparing a lubricating oil concentrate of a viscosity index improver having sludge dispersing properties and a number average molecular weight in the range of about 10,000 to 250,000; comprising dissolving from 5 to 30 weight percent of ethylene copolymer comprising 30 to 80 wt. % ethylene and 20 to 70 wt. % $C_3$ to $C_{18}$ alpha-olefin in a mineral lubricating oil as solvent, maintaining said resulting copolymer-oil solution at a temperature of from about 100° C. to about 250° C. and under an inert atmosphere while admixing an ethylenically-unsaturated dicarboxylic acid material selected from the group consisting of maleic anhydride, maleic anhydride derivatives, maleic acid and fumaric acid, and a free-radical initiator having a boiling point in excess of about 100° C. into said solution, wherein the weight ratio of said dicarboxylic acid material to said initiator is about 1:1 to 30:1, and maintaining said temperature and inert atmosphere for about 0.1 to 12 hours to graft said acid material onto said ethylene copolymer and said solvent, without substantial molecular weight breakdown of said ethylene copolymer, and thereafter reacting carboxy groups of said grafted polymer with a polyfunctional material selected from the group consisting of polyamines having 3 to 20 carbon atoms and 2 to 12 nitrogen atoms, $C_2$ to $C_{30}$ polyols having 2 to 10 hydroxyl radicals, and $C_2$ to $C_{30}$ hydroxy amines having 1 to 6 hydroxy groups and 1 to 10 nitrogen atoms, to thereby form said lubricating oil concentrate.

2. A process according to claim 1, wherein said $C_3$ to $C_{18}$ alpha-olefin is propylene and said dicarboxylic acid material is maleic anhydride.

3. A process according to claim 2, wherein said polyfunctional material is said polyamine.

4. A process according to claim 2, wherein said polyfunctional material is a polyol.

5. A process according to claim 2, wherein said polyfunctional material is a hydroxy amine.

6. A process according to claim 1, wherein said initiator is a peroxide.

7. A process according to claim 6, wherein said initiator is 2,5-dimethyl-hex-3-yne-2,5-bis-tertiary-butyl peroxide and is used in a concentration of from about 0.005 to 1 wt. %, based upon the total weight of said copolymer-oil solution.

8. A process according to claim 7, wherein said grafting temperature is in the range of 120° to 190° C.

9. A process according to claim 8, wherein the weight ratio of said dicarboxylic acid material to said initiator is within the range of 2.0:1 to 5.0:1.

10. The lubricating oil concentrate produced by the process of claim 1.

11. The lubricating oil concentrate produced by the process of claim 3.

12. The lubricating oil concentrate produced by the process of claim 4.

13. The lubricating oil concentrate produced by the process of claim 5.

14. A lubricating oil composition comprising a major proportion of lubricating oil and a minor V.I. improving amount of the concentrate of claim 10.

15. A lubricating oil composition comprising a major proportion of lubricating oil and a minor V.I. improving amount of the concentrate of claim 11.

16. A lubricating oil composition comprising a major proportion of lubricating oil and a minor V.I. improving amount of the concentrate of claim 12.

17. A lubricating oil composition comprising a major proportion of lubricating oil and a minor V.I. improving amount of the concentrate of claim 13.

* * * * *